Patented Nov. 29, 1927.

1,650,950

UNITED STATES PATENT OFFICE.

HOWARD W. MATHESON, OF MONTREAL, QUEBEC, AND KENNETH G. BLAIKIE, OF SHAWINIGAN FALLS, QUEBEC, CANADA, ASSIGNORS TO CANADIAN ELECTRO PRODUCTS COMPANY, LIMITED, OF MONTREAL, CANADA.

MANUFACTURE OF LACTIC-ACID ESTERS.

No Drawing.   Application filed September 4, 1925.   Serial No. 54,552.

This invention relates to the manufacture of lactic acid esters and the object of the invention is the provision of a process by means of which the esters may be made easily, inexpensively and economically, in substantially anhydrous condition, in one operation directly from the corresponding alcohols without a separate preliminary preparation of lactic acid or its salts.

Briefly, the process consists in causing the reaction of acetaldehyde-cyanhydrin, an approximately equimolecular amount of water and an alcohol, in presence of a mineral acid sufficient to combine with the ammonia liberated. The water present is therefore less than would serve to hydrolyze all the cyanhydrin to lactic acid but it will be understood that the cyanhydrin goes directly to ester without hydrolysis.

The reactions theoretically take place according to the following equations;—

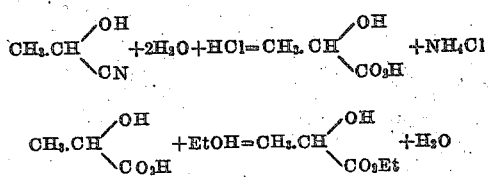

It will be seen that two molecules of water enter into the first reaction and one molecule of water is liberated on esterification.

We have found that substantially anhydrous lactic acid esters may be prepared directly and in one stage from acetaldehyde-cyanhydrin and an alcohol by the use of approximately only one molecule of water to each molecule of cyanhydrin, the reaction being theoretically;—

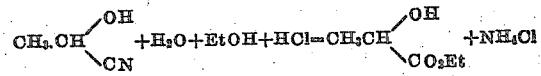

In carrying out the reaction, acetaldehyde-cyanhydrin may be first prepared by the interaction of substantially anhydrous hydrocyanic acid and anhydrous acetaldehyde in presence of a trace of alkali or a cyanide. The cyanhydrin thus prepared is suitable for use without purification and may be admixed with water, in proportion of one molecule of cyanhydrin to approximately one molecule of water, and with a suitable amount of an alcohol and the correct proportion of a mineral acid or a small excess to combine with the ammonia liberated. A slight excess of acid may be found advisable. The mixture is then heated, when using ethyl alcohol, to a temperature of about 80° C. for approximately three hours. A wide variation of temperature is possible for any alcohol and the range will vary depending on the alcohol used, but the heating should not be such as will cause the temperature to rise to a point where the yield of the ester is seriously decreased, such as would occur at 160° C.

Any suitable mineral acid may be used but hydrochloric acid is found preferable, either dissolved in the reaction mixture or in the alcohol.

The following examples will serve to illustrate the carrying out of the process for the manufacture of ethyl lactate, but it will be understood that the invention is not limited to the production of this particular ester nor to the proportions, modes of operation, temperatures, acid used, either for production of ethyl lactate or any other lactate, the same being purely illustrative.

*Example I.*

710 parts by weight (1 molecule) acetaldehyde-cyanhydrin, 1380 parts by weight (3 molecules) ethyl alcohol, and 258 parts by weight aqueous hydrochloric acid (35.5%) are mixed together in a suitable container fitted with a thermometer, a water-cooled reflux and a gas delivery tube. Dry, gaseous hydrogen-chloride is led into the mixture and the temperature maintained at about 30–35° by means of cold water. The container is weighed from time to time. When a total of 370 parts of hydrogen-chloride is present, the gas stream is cut off and the product, which now is filled to a considerable extent with a crystalline precipitate of ammonium chloride, is heated to approximately 80° C. for three hours, when the reaction is over. After cooling, the solid ammonium chloride is filtered from the reaction product and thoroughly washed with a minimum quantity of alcohol. It will be noted from the proportions used that only one molecule of water was added to one molecule of cyanhydrin and that the hydrogen-chloride is present in approximately 1% excess. The reaction product now consists of a mixture of unchanged alcohol, which is present in excess, and ethyl lactate, the cyanhydrin being converted almost quantitatively. The small trace of acid left in the reaction mixture is neutralized with a calculated amount of alcoholic ammonia and again filtered from a precipitated solid. The material can now be fractionated for the separation of the alcohol and the ethyl lactate by distillation, either at ordinary pressure or in vacuo. A small residue is left behind.

*Example II.*

It may be found more convenient to add all the hydrogen-chloride in solution in alcohol, for which purpose a stock solution of this material may be kept. The following illustrates this method of carrying out the reaction:—

143.5 parts of acetaldehyde-cyanhydrin of 99% purity are admixed with 118 parts of ethyl alcohol and 26 parts of water, all by weight. This mixture is warmed to approximately 55° C. and 356.4 parts of alcoholic hydrogen-chloride are added, the concentration of hydrogen-chloride in the ethyl alcohol being 23.6%. The alcoholic hydrogen-chloride is run in slowly, the whole being vigorously stirred. The alcohol used is of such concentration as to make up the amount of water to two molecules or thirty-six parts. The reaction proceeds quietly. The temperature should be kept below 70° C. by cooling if necessary. During the addition of the alcoholic hydrogen-chloride, ammonium chloride separates. After the addition of the solution, which takes about 2½ hours, the reaction mixture is heated to 82°–85° C. for three hours. In carrying out the reaction, it appears necessary to keep the temperature below the boiling point of alcohol until most of the hydrogen-chloride has been taken up by the reaction, as otherwise the hydrogen-chloride and alcohol react to give ethyl chloride, with consequent loss of acid and alcohol.

When the reaction is complete, ammonium chloride is filtered off and washed with the minimum quantity of ethyl alcohol. The hydrogen chloride being present in excess, the acidity is determined and the liquid neutralized with alcoholic potash, alcoholic ammonia, sodium acetate, or any other suitable neutralizing agent.

After filtering again from any precipitated solid, the product is distilled, preferably under diminished pressure, and finally fractionated at ordinary pressure, whereby the separation of alcohol and ethyl lactate is effected.

The total ester recovered, with a boiling point of 148°–150° C., equals 205.5 parts, being a yield of approximately 90%; the ammonium chloride recovered=100 parts, being a yield of 93.6%; a small residue is left behind on fractionation, amounting to 7.5 parts.

In the foregoing examples, ethyl alcohol has been used with production of ethyl lactate. In a manner similar to that of either of the examples methyl lactate may be made and, keeping the correct molecular proportions, similar results are obtained as regards yield. Proceeding in similar manner and using other alcohols, either aliphatic or aromatic, the corresponding esters of lactic acid may be produced.

Considerable variation may be made in the method, both in proportions and in temperature, without departing from the spirit of the invention. While the reaction will proceed at room temperature, the rate of reaction is not economical and heating is preferable and may be carried to any temperature up to the point already noted.

Having thus described our invention, what we claim is;—

1. A process for the production of lactic acid esters, which comprises reacting together acetaldehyde-cyanhydrin and an alcohol in presence of a mineral acid and less water than would serve to hydrolyze all the cyanhydrin to lactic acid.

2. A process for the production of lactic acid esters, which comprises reacting together acetaldehyde-cyanhydrin and an alcohol in presence of a mineral acid and water in amount substantially equimolecular with the cyanhydrin.

3. A process for the production of lactic acid esters, which comprises reacting together acetaldehyde-cyanhydrin and an alcohol in presence of a mineral acid in slight excess and water in amount less than would serve to hydrolyze all the cyanhydrin to lactic acid.

4. A process for the production of lactic acid esters, which comprises reacting together acetaldehyde-cyanhydrin and an alcohol in presence of a mineral acid in slight excess and water in amount substantially equimolecular with the cyanhydrin.

5. A process for the production of lactic acid esters, which comprises reacting together acetaldehyde-cyanhydrin and an alcohol in presence of a mineral acid and less water than would serve to hydrolyze all the cyanhydrin to lactic acid, and heating the mixture at a temperature below that at which the mineral acid reacts with the formed ester.

6. A process for the production of lactic acid esters, which comprises reacting together acetaldehyde-cyanhydrin and an alcohol in presence of a mineral acid and water in amount substantially equimolecular with the cyanhydrin, and heating the mixture at a temperature below that at which the mineral acid reacts with the formed ester.

7. A process for the production of lactic acid esters, which comprises reacting together acetaldehyde-cyanhydrin and an alcohol in presence of a mineral acid in amount sufficient to combine with the liberated ammonia and in presence of less water than would serve to hydrolyze all the cyanhydrin to lactic acid.

8. A process for the production of lactic acid esters, which comprises reacting together acetaldehyde-cyanhydrin and an alcohol in presence of a mineral acid in amount sufficient to combine with the liberated ammonia and in presence of water in amount substantially equimolecular with the cyanhydrin.

9. A process for the production of ethyl lactate, which comprises reacting together acetaldehyde-cyanhydrin and ethyl alcohol in presence of a mineral acid and less water than would serve to hydrolyze all the cyanhydrin to lactic acid.

10. A process for the production of ethyl lactate, which comprises reacting together acetaldehyde-cyanhydrin and ethyl alcohol in presence of hydrochloric acid and less water than would serve to hydrolyze all the cyanhydrin to lactic acid.

11. A process for the production of ethyl lactate, which comprises reacting together acetaldehyde-cyanhydrin and ethyl alcohol in presence of a mineral acid and water in amount substantially equimolecular with the cyanhydrin.

12. A process for the production of ethyl lactate, which comprises reacting together acetaldehyde-cyanhydrin and ethyl alcohol in presence of hydrochloric acid and water in amount substantially equimolecular with the cyanhydrin.

13. A process for the production of ethyl lactate, which comprises reacting together acetaldehyde-cyanhydrin and ethyl alcohol in presence of sufficient hydrochloric acid to combine with the liberated ammonia and in presence of less water than would serve to hydrolyze all the cyanhydrin to lactic acid.

14. A process for the production of ethyl lactate, which comprises reacting together acetaldehyde-cyanhydrin and ethyl alcohol in presence of sufficient hydrochloric acid to combine with the liberated ammonia and in presence of water in amount substantially equimolecular with the cyanhydrin.

In witness whereof, we have hereunto set our hands.

HOWARD W. MATHESON.
KENNETH G. BLAIKIE.